Nov. 10, 1925.  1,560,762
G. B. COLEMAN
ELECTRIC MOTOR
Filed July 2, 1921   2 Sheets-Sheet 2

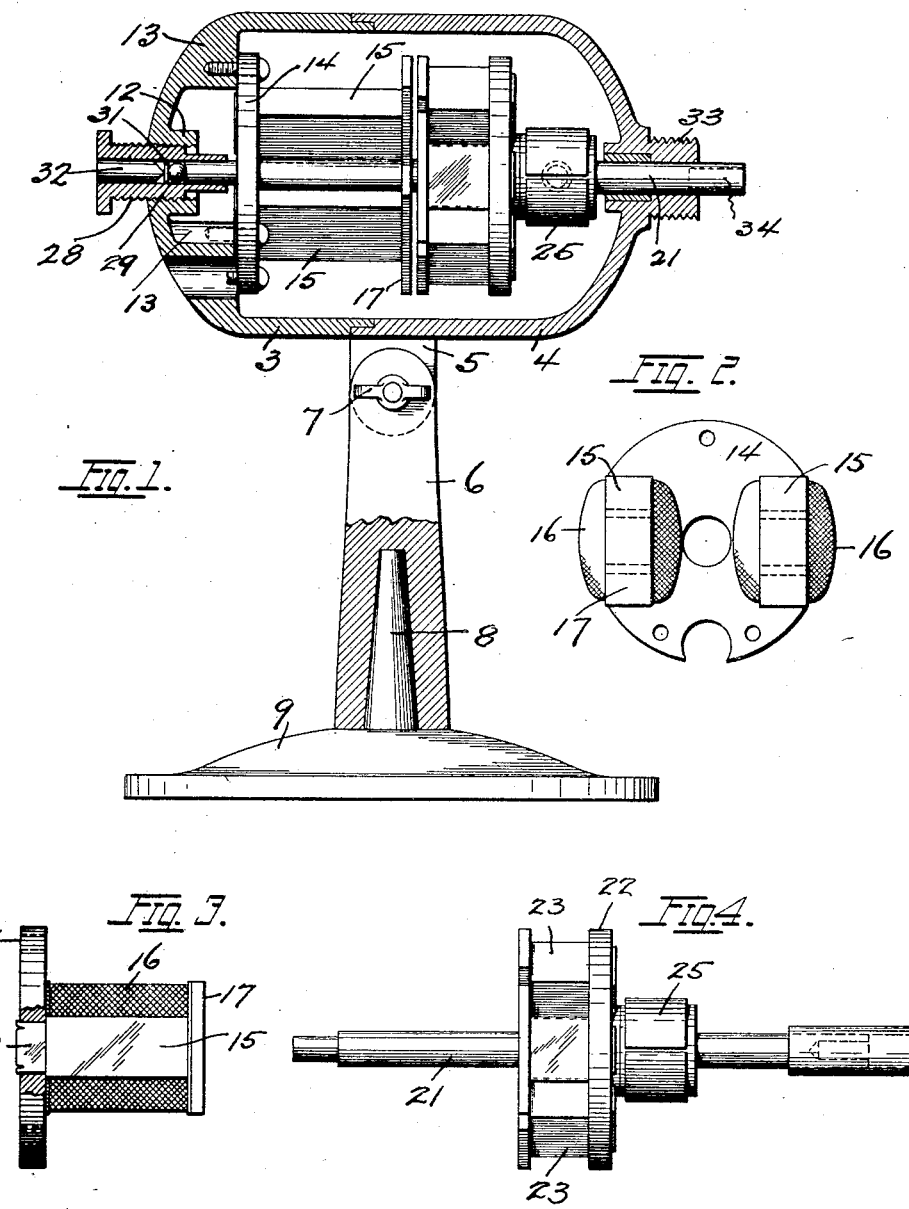

WITNESS
H. Sherburne

INVENTOR
GEO. B. COLEMAN
BY
White Prost & Evans
his ATTORNEYS

Patented Nov. 10, 1925.

1,560,762

UNITED STATES PATENT OFFICE.

GEORGE B. COLEMAN, OF SAN FRANCISCO, CALIFORNIA, ASSIGNOR TO MAJIK ELECTRIC APPLIANCE COMPANY, OF SAN FRANCISCO, CALIFORNIA, A CORPORATION OF CALIFORNIA.

ELECTRIC MOTOR.

Application filed July 2, 1921. Serial No. 482,096.

*To all whom it may concern:*

Be it known that I, GEORGE B. COLEMAN, a citizen of the United States, and a resident of the city and county of San Francisco, State of California, have invented a certain new and useful Electric Motor, of which the following is a specification.

The invention relates to electric motors and particularly to small motors, although many features of the invention are applicable to motors of the larger sizes.

An object of the invention is to provide an electric motor which is simple and cheap of manufacture and efficient in operation.

Another object of the invention is to provide a variable speed motor in which variation of speed is accomplished without loss of efficiency or increased heating of the motor.

A further object of the invention is to provide a motor constructed in such manner as to be readily attachable to various devices to be operated.

The invention possesses other advantageous features, some of which, with the foregoing, will be set forth at length in the following description where I shall outline in full, that form of the invention which I have selected for illustration in the drawings accompanying and forming part of the present specification. In said drawings, I have shown one embodiment of the motor of my invention, but it is to be understood that I do not limit myself to such form, since the invention, as set forth in the claims, may be embodied in a plurality of forms.

Referring to said drawings:

Figure 1 is an elevation of the motor mounted on a support, the motor casing and the support being broken away to disclose the construction.

Figure 2 is an end elevation of the stator or field structure.

Figure 3 is a side elevation of the stator or field structure, a field coil being shown in section.

Figure 4 is a side elevation of the rotor or armature structure.

Figure 5:
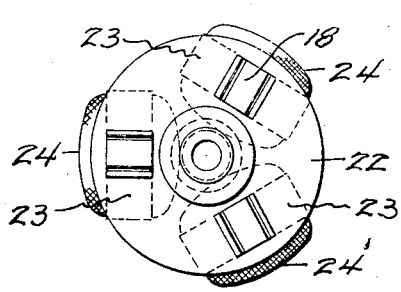
Figure 5 is an end elevation of the rotor or armature structure.
Figure 6:
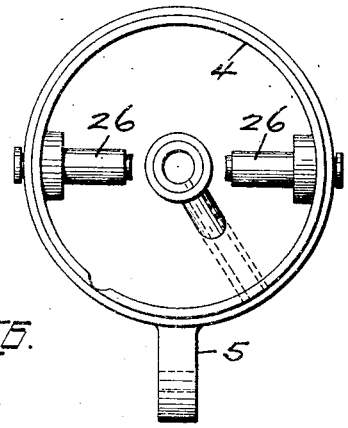
Figure 6 is an end view of the forward half of the motor casing.

The motor shown in the accompanying drawings is of the small motor type which is particularly adapted for driving small devices such as fans, beaters, vibrators, etc., although the invention in many aspects is applicable to motors of larger size. One of my objects is to produce a small general utility variable speed household motor which may be manufactured and sold at a low cost. The present motor comprises a casing or shell formed of two bells 3—4 securely fitted together. One bell 4 is provided with a lug 5 to which a handle 6 is pivotally connected, a thumb nut 7 being employed to tighten the joint. When the motor is used to operate a vibrator, it is held by the handle and the handle is designed to cooperate with a suitable base to support the motor when it is used to drive a fan. For this purpose, the handle is formed with a recess therein which is engaged by a standard 8 on the base 9.

The rear bell 3 of the motor is provided at its end on the inside with an integral concentric sleeve 12 which forms the bearing support for the armature shaft and with bosses 13, to which the field plate 14 is secured. The field structure comprises the field plate 14, to which the laminated field pole pieces 15 are secured and the coils 16 surrounding the field pole pieces. Each field pole piece is composed of a block of laminations, having an enlarged head 17 at one end and a narrow neck 18 at the other end which extends through an aperture in the field plate 14. At the rear side of the plate, the end of the neck is upset by chisel cuts extending across the laminations, thereby locking the pole pieces in place. The field windings 16 are preferably wound separately and slipped over the pole piece before the pole piece is attached to the field plate, thereby providing for cheapness in manufacture. The motor shown in the drawings has two field poles.

The armature is secured to the motor shaft 21 and comprises an armature plate 22 having regularly spaced apertures therein to receive three armature pole pieces 23 of the same construction as the field pole pieces, each armature pole piece being provided with a coil 24. Secured to the shaft, directly in front of the armature plate 22, is a three-segment commutator 25, which is connected to the armature windings. The front bell 4 is provided with diametrically spaced hollow bosses on the inside, in the zone of the commutator in which the commutator brush holders 26 are disposed. The motor is preferably a series wound motor, one lead being connected directly to one brush 27 and the other lead being connected to the other brush 28' through the field windings 16.

The heads of the field pole pieces and armature pole pieces are disposed in close relation, both field and armature structures being concentric with the shaft, and means are provided for varying the length of the air gap between the field poles and armature poles, to vary the speed of the armature. In the present construction the length of the air gap is varied by moving the armature axially with respect to the field structure, and this is accomplished by moving the shaft longitudinally, the commutator being made sufficiently wide to permit perfect commutation, regardless of the adjustment of the armature.

Screwed into the sleeve 12 on the bell 3 is an adjustable bearing member 28 into which the shaft 21 extends and in which it obtains lateral bearing. When the motor is used for driving a fan or similar device, or when the air gap between the poles, is lengthened, there is an end thrust on the shaft and a thrust bearing is arranged in the adjustable member 28 to accommodate this thrust. The thrust bearing comprises a ball 29 against which the end of the shaft 21 bears. The ball is backed by a disc 31 which bears against a conical plug 32 in the adjustable member 28.

Figure 7:
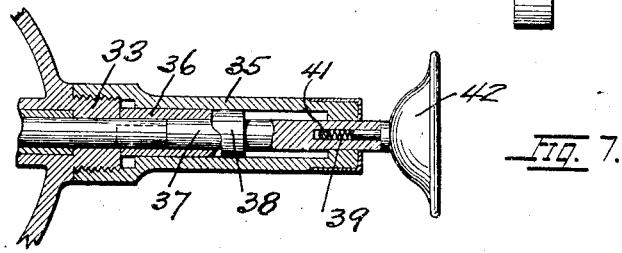
Figure 7 is a longitudinal section through the driving end of the motor showing a vibrator attached thereto.
Figure 8:
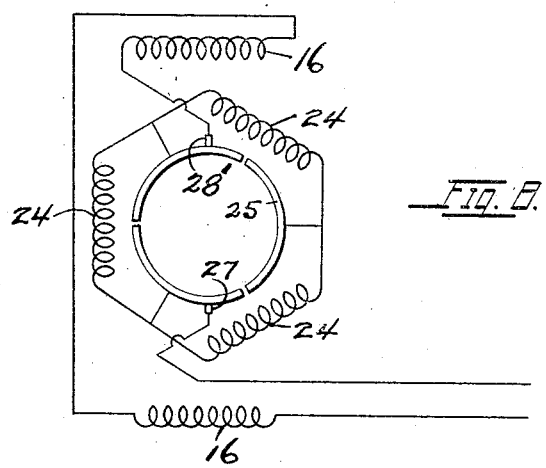
Figure 8 is a diagrammatic representation of the windings of the motor.

The forward bell 4 is provided with a threaded nipple 33 surrounding the shaft, for the attachment of guards and holding devices for the various implements with which the motor is to be used. The shaft 21 is provided at its end with a threaded recess 34 to engage the implement or device to be driven. In Fig. 7 I have shown a vibrator attached to the motor. Screwed to the nipple 33 is a tube 35 carrying a bushing 36 within which is disposed a rotating plug 37 secured to the shaft and having a cam shaped end. Engaging the block is a tappet 38 having a complementary face so that the tappet is oscillated or vibrated longitudinally by rotation of the shaft. The tappet is held against the block by a spring 39 seated in the tappet and secured to a pin 41 which engages a shoulder on the tube 35. The vibrator applicator 42 is secured to the end of the tappet.

I claim:

1. In a dynamo electric machine, a magnetic core structure comprising a plurality of laminations and a support for the laminations having an aperture through which the laminations extend, the extended portions of the laminations being upset so that the edges of the laminations firmly engage the inner surface of the aperture and surfaces adjacent thereto.

2. In an electric motor, an electro-magnetic structure comprising a plate having an aperture therein, a pole piece comprising a block of laminations, a neck on said block extending through and projecting beyond said plate, and indentations in the end face of said neck perpendicular to the laminations, spreading a portion of each lamination sideways to secure the block to the plate.

3. In a dynamo electric machine, a field structure and a relatively rotatable armature structure axially displaced with respect to the field; the field structure comprising a pair of symmetrically disposed pole pieces with their axes substantially parallel to the axis of rotation, and the armature structure comprising three symmetrically disposed pole pieces with their axes substantially parallel to the axis of rotation and radially displaced therefrom by an amount substantially equal to the displacement of the axes of the field pole pieces from the axis of rotation.

In testimony whereof, I have hereunto set my hand.

GEORGE B. COLEMAN.